United States Patent [19]

Butcher et al.

[11] Patent Number: 4,867,398

[45] Date of Patent: Sep. 19, 1989

[54] RADIO MOUNTING ASSEMBLY HAVING SELF-ALIGNING TRIM BEZEL

[75] Inventors: James D. Butcher; Eugene R. Bastien, both of Utica, Mich.

[73] Assignee: General Motors Corporation, Detroit, Mich.

[21] Appl. No.: 238,719

[22] Filed: Aug. 30, 1988

[51] Int. Cl.⁴ .............................................. G12B 9/00
[52] U.S. Cl. ................................ 248/27.3; 248/221.3; 312/7.1; 312/242; 312/257.1
[58] Field of Search ...................... 248/27.1, 27.3, 544, 248/558, 551, DIG. 9, 298, 221.3, 221.4; 312/242, 296, 328, 7.1, 257 A

[56] References Cited

U.S. PATENT DOCUMENTS

| | | |
|---|---|---|
| 3,231,225 | 1/1966 | Bakke . |
| 3,922,047 | 11/1975 | Tsuji . |
| 3,954,242 | 5/1976 | Yoda . |
| 4,067,654 | 1/1978 | Maniaci . |
| 4,068,175 | 1/1978 | Maniaci . |
| 4,211,976 | 7/1980 | Inoue . |
| 4,334,659 | 6/1982 | Yuda . |
| 4,378,099 | 3/1983 | Ikeda et al. . |
| 4,462,564 | 7/1984 | Alves et al. . |
| 4,560,124 | 12/1985 | Alves et al. . |
| 4,562,595 | 12/1985 | Bauer et al. . |
| 4,572,465 | 2/1986 | Rasca . |
| 4,699,341 | 10/1987 | Ponticelli . |
| 4,738,420 | 4/1988 | Angle et al. . |
| 4,756,495 | 7/1988 | Putnam .............................. 248/27.3 |
| 4,784,357 | 11/1988 | Kilmura ............................ 248/551 X |
| 4,812,133 | 3/1989 | Fleak et al. ..................... 248/27.3 X |

Primary Examiner—Reinaldo P. Machado
Assistant Examiner—David L. Talbott
Attorney, Agent, or Firm—William A. Schuetz

[57] ABSTRACT

A radio mounting assembly is disclosed having a pair of brackets for mounting a radio to an instrument panel of an automotive vehicle, a decorative trim bezel for concealing the space between the instrument panel and radio, fastener means for detachably connecting the bezel to the instrument panel without the fasteners being visible and wherein the bezel and the mounting brackets for the radio have cooperable means on there to automatically center and position the bezel relative to the radio face when being secured to the instrument panel.

10 Claims, 2 Drawing Sheets

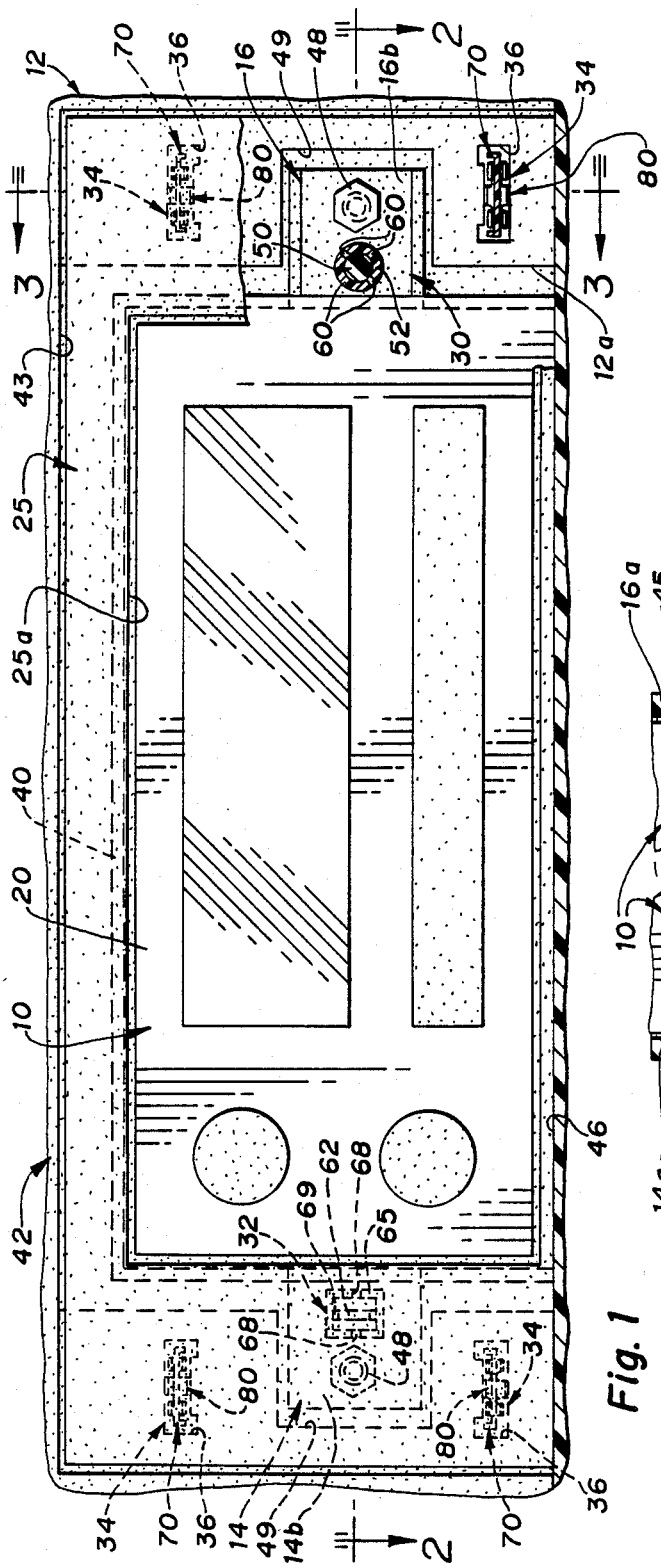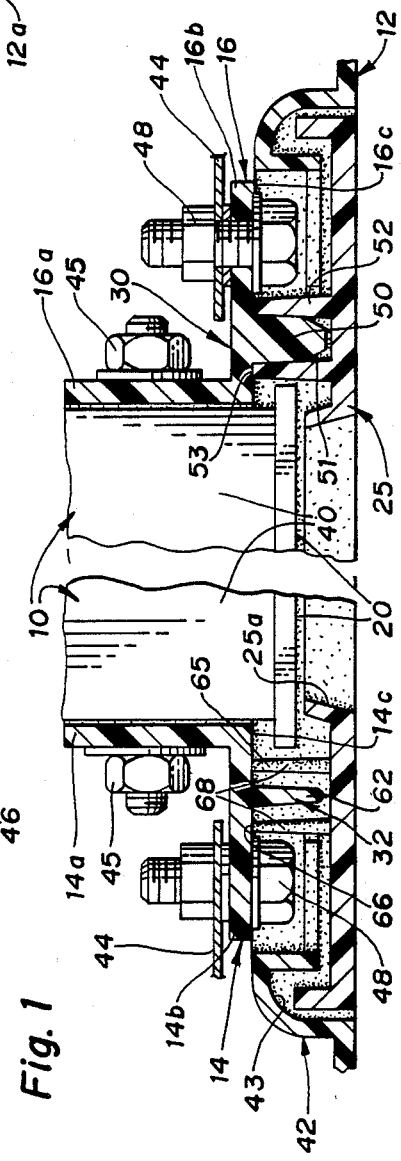

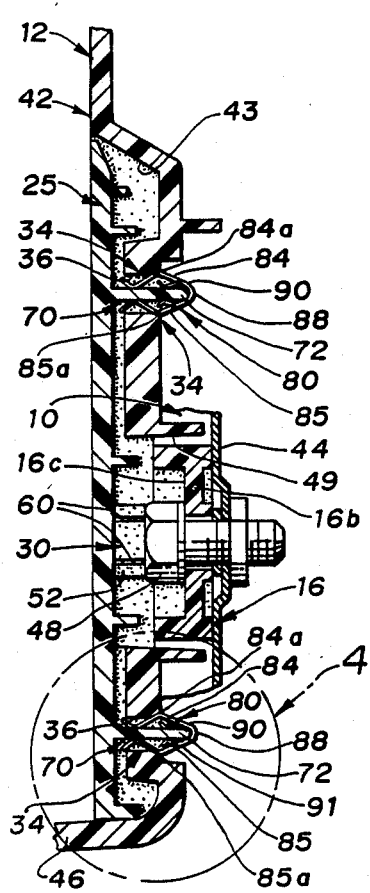
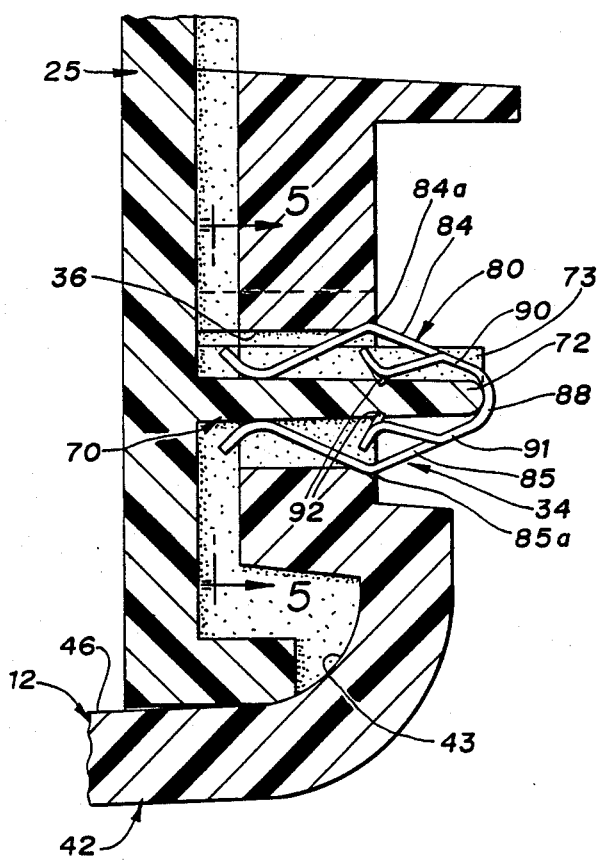
Fig. 3　　Fig. 4
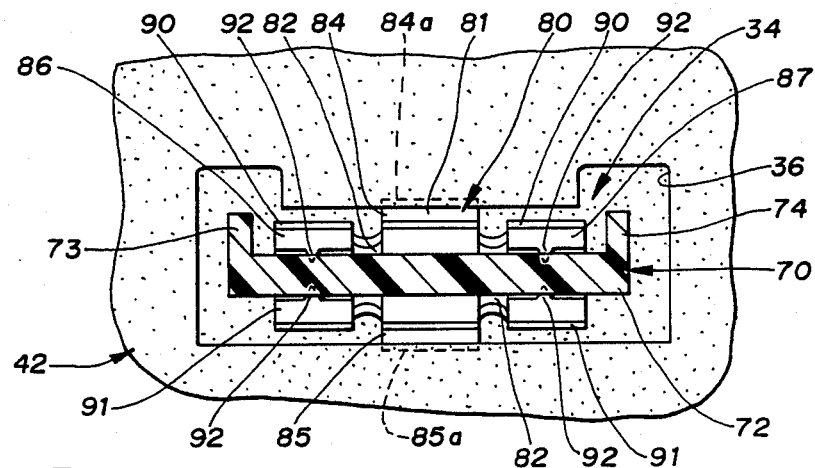
Fig. 5

RADIO MOUNTING ASSEMBLY HAVING SELF-ALIGNING TRIM BEZEL

The present invention relates to a radio mounting assembly and, more particularly, to a radio mounting assembly having a pair of brackets for attaching a radio to an instrument panel means of an automotive vehicle, a decorative trim bezel for concealing the space between the instrument panel and radio and cooperable means on the bezel and brackets to automatically center and position the bezel relative to the radio face.

Automotive radios usually are mounted to an instrument panel via brackets attached to the radio and instrument panel and with the face of the radio being disposed within a through opening in the instrument panel. Typically, a radio trim bezel for concealing the opening between the radio and the instrument panel is employed. The radio trim bezels are usually installed directly to the instrument panel or fascia surrounding the radio. However, due to the large size of an instrument panel, its inherent flexibility, various body attachment planes and locations, and other sundry openings and attaching parts it is common that the trim bezels, when installed, are not properly centered and positioned with respect to the face of the radio. That is, the bezel and radio face are misaligned either vertically, horizontally or fore and aft with respect to the radio. Only slight misalignment between the bezel and the radio face is perceptively visible and apparent to the driver or passenger and is oft times perceived as poor quality and workmanship by the customer.

Accordingly, it is a broad object of the present invention to provide a new and improved radio mounting assembly for mounting a radio to an instrument panel means of an automotive vehicle which includes first and second mounting brackets secured to the radio at opposite side locations thereof and secured to the instrument panel means and with the radio having its front face extending through an opening in the instrument panel means, a decorative trim bezel for concealing the space between the radio and the instrument panel means and means for attaching the trim bezel in place on the instrument panel means, and in which the trim bezel and brackets include cooperable means for automatically self centering the decorative trim bezel to the radio face when the trim bezel is being connected to the instrument panel means so that the trim bezel will be aligned horizontally, vertically and fore and aft of the radio face.

Another object of the present invention is to provide a new and improved radio mounting assembly, as defined in the next preceding object, and in which the cooperable means comprises a cylindrical pin extending normal to a planar flange on one of the brackets and a rectangularly shaped pin extending normal to a planar face on the other of said brackets, and in which the bezel on its rearward side includes a first cylindrical bushing of a predetermined axial length and a second rectangularly shaped bushing of a predetermined axial length and whose width is greater than the width of the rectangularly shaped pin on the other of the brackets, and wherein the cylindrically shaped pin is snugly and pivotally received within the cylindrically shaped bushing and the rectangularly shaped pin along its top and bottom sides is snugly received within the rectangularly shaped bushing until the bushings engage the planar surfaces whereby the trim bezel will be automatically centered vis-a-vis the face of the radio both horizontally and vertically as well as fore and aft.

A further object of the present invention is to provide a new and improved radio mounting assembly, as defined in the next preceding object, and in which the cylindrical and rectangularly shaped bushings have axially extending through side slots to increase their radial flexibility during assembly of the trim bezel to the mounting brackets.

Yet another object of the present invention is to provide a new and improved radio mounting assembly, as defined in the preceding objects, and wherein the means for attaching the bezel to the instrument panel means comprises a plurality of deflectable clips carried by the bezel adjacent its rear face which are force fitted through horizontally oversized opening in the instrument panel means to retain the bezel in place and without clips being visible from the front face of the bezel.

A still further object of the present invention is to provide a new and improved radio mounting assembly, as defined in the next preceding object, and in which the clips are made from resilient metal and force fitted over tabs extending rearwardly from the bezel and in a manner such that the clips cannot be pulled from the tabs once connected thereto and in which the clips include deflectable leg portions which are deflected as the clips are inserted through the openings in the instrument panel means and then spring behind the instrument panel means to hold the bezel in place, the clip enabling the trim bezel to be detached from the instrument panel by reverse pulling motion on the bezel, but without the clips being removed from the tabs on the bezel.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a fragmentary, front elevational view of an instrument panel of an automotive vehicle and showing a radio and associated trim bezel mounted thereto;

FIG. 2 is s fragmentary sectional view taken along the lines 2—2 of FIG. 1;

FIG. 3 is sectional view taken along the lines 3—3 FIG. 1;

FIG. 4 enlarged fragmentary sectional view of that part FIG. 3 denoted by the phantom circle 4 in FIG. 3; and FIG. 5 is a fragmentary sectional view taken along the lines 5—5 of FIG. 4.

The present invention provides a novel radio mounting assembly for mounting a radio 10 to an instrument panel means 12 of an automotive vehicle. The novel radio mounting assembly comprises, in general, a pair of support brackets 14, 16, secured to the radio at opposite side locations thereof and which are secured to the instrument panel means 12 and with the radio 10 having its front face 20 extending through an opening 12a in the instrument panel means 12, a decorative trim bezel 25 for covering the space between the radio 10 and the opening 12a in the instrument panel means, cooperable means 30 and 32 on the brackets 16 and 14 and the trim bezel 25, respectively, for automatically centering the trim bezel 25 with respect to the front face 20 of the radio 10 and snap fitting fastener means 34 carried by the trim bezel 25 and which are adapted to be force fitted through openings 36 in the instrument panel means 12 to secure the trim bezel 25 in place.

The radio 10 could be of any suitable or conventional construction and is hereshown as being housed in a rectangularly shaped housing 40. The instrument panel means 12 includes an outer plastic instrument panel 42 which is provided with a rectangularly shaped recessed portion 43 and with the bottom of the recessed portion 43 having the rectangularly shaped opening 12a through which the face 20 of the radio 10 extends. The instrument panel means 12 also includes a sheet metal backing or support 44 (see FIG. 3) to which the instrument panel 42 is adapted to be secured. It should be noted that the brackets 14 and 16 are disposed within cut-outs 49 extending laterally of the opening 12a in the instrument panel means 12 so as to be accessible from the front of the instrument panel 42.

The mounting brackets 14, 16 are made from hard plastic and are L-shaped. As best shown in FIGS. 1 and 2, the brackets 14 and 16 each have one leg 14a and 16a thereof secured to the adjacently located side of the radio housing 40 via suitable bolts or fasteners 45. The brackets 14 and 16 have their other leg 14b and 16b extending perpendicular to the legs 14a and 16a. respectively, and with the legs 14b and 16b along their sides 14c and 16c facing toward the bezel 25 being smooth and planar. The sides 14c and 16c lie in a vertical plane which is parallel to the plane of the bezel 25. The legs 14b and 16b of the brackets 14 and 16 are secured to the metal backing or support 44 for the instrument panel means 12 via suitable bolts 48. This secures the radio 10 to the instrument panel means 12 so as to be horizontally disposed.

The radio trim bezel 25 is rectangular in shape and has a rectangularly shaped, central through opening 25a which is smaller than the radio face 20 so that the trim bezel 25 overlaps the radio face 20. The radio trim bezel 25 has horizontal and vertical dimensions such that it closely fits within the recess 43 in the instrument panel 42 and so that three sides of the bezel 25 (the two lateral sides and the top) lie flush with the adjacent outer surface of the instrument panel 42. The bottom edge of the bezel is located closely adjacent to or rests on an outwardly extending shelf portion 46 on the instrument panel 42.

In accordance with one of the provisions of the present invention, a novel cooperating means 30 and 32 on the brackets 14 and 16 and the bezel 25 are provided to automatically center or align the bezel 25 with respect to the radio face 20 when the bezel 25 is connected to the outer plastic instrument panel 42. The cooperable means 30 comprises a cylindrical pin 50 formed integral with the leg 16b of the plastic bracket 16 and which extends normal to the planar surface 16c of the leg 16b. The cylindrical pin 50 extends toward the bezel 25 and has a tapered end 51. That is, the free end of the cylindrical pin 50 has a converging taper 51, and for a reason to be hereinafter more fully described. The cooperable means 30 further includes a cylindrical bushing 52 formed integral with the bezel 25 at its back side facing toward the instrument panel 42. The bushing 52 extends normal to the backside of the bezel 25. The bushing 52 is of a predetermined axial length and has an end surface 53 at its end remote from the bezel 25 which is planar and adapted to engage the planar face 16c of the bracket 16. The bushing 52 also has a plurality of axially extending through slots 60 along its entire axial length so as to increase the radial flexibility of the cylindrical bushing 52.

The cooperable means 32 comprises a generally rectangularly shaped pin or blade 62 which is formed integral with the flange 14b of the bracket 14 and which extends normal to the planar surface 14c thereof. In addition, the bezel 25 is provided with a generally rectangularly shaped bushing 65 of a predetermined axial length. The bushing 65 at its end remote from the bezel is planar and is adapted to engage the planar surface 14c of the bracket 14 and the bushing 65 has a horizontal internal width which is greater than the horizontal width of the rectangularly shaped pin 62. The rectangularly shaped bushing 65 also has a pair of axially extending through slots 68 extending for its entire length in its vertically disposed sides. The slots 68 enhance the flexibility of the top and bottom sides of the bushing 65, as viewed in FIG. 1. The pin 62 at its free end 69 is convergently tapered to facilitate insertion within the bushing 65.

When the bezel 25 is being secured to the instrument panel 42, the bushing 52 will snugly but pivotally receive the cylindrical pin 50 and the rectangularly shaped bushing 65 will snugly receive the cylindrical pin 62 along its top and bottom sides. The tapered ends 51 and 69 of the pins 50 and 62 facilitate insertion of the pins 50 and 62 within the bushings 52 and 65. Likewise, the provision of the slots 60 and 68 in the bushings 52 and 65 allow the bushings to radially or outwardly expand somewhat to accommodate easy insertion of the pins 50 and 62 within the respective bushings 52 and 65.

Since the pins 50 and 62 are accurately located vis-a-vis the legs 14a and 16a of the brackets 14 and 16, the brackets 14 and 16 accurately positioned with respect to the radio face and since the bushings are accurately located with respect to the opening 25a in the bezel 25, it can be readily seen that when the bezel 25 is being attached to the instrument panel 42, that the cylindrical pin 50 accurately aligns the bezel 25 horizontally as well as vertically with respect to the radio face 20 and that the engagement between the upper and lower sides of the pin 62 with the bushing 65 also accurately locates the position of the bezel 25 vertically with respect to the radio face 20. By providing a rectangular bushing 65 which is wider than the rectangular pin 62, any tolerance variation in horizontal spacing between the pins 50 and 62 is readily accommodated. In addition, the engagement of the planar ends 53 and 66 of the bushings 52 and 65 with the planar faces 14c and 16c of the brackets 14 and 16, also positions the bezel 25 very accurately fore and aft with respect to the radio face 20. It is thus apparent that with the provision of the cooperable means 30 and 32 on the brackets 14 and 16 and the bezel 25, that the bezel 25 is automatically centered with respect to the radio face 20 when being attached to the instrument panel means 42.

The bezel 25 is adapted to be detachably connected to the instrument panel 42 via the fastener means 34. As best shown in FIG. 1, the bezel 25 is provided with a fastener means 34 located adjacent each of its four corners and, since all the fastener means 34 are of an identical construction, only the rightmost lower fastener means 34, as shown in FIG. 1, will be described in detail.

The fastener means 34 each comprises a trough or U-shaped tab 70 formed integral with the bezel 25 and which extends normal to its backside or rear face thereof. As best shown in FIG. 5, the tabs 70 includes a planar bottom 72 and a pair of sides 73 and 74. Secured to the bottom 72 of the tab 70 is a spring clip 80. The spring clip 80 is of a one-piece construction and is stamped from a suitable resilient metal material to the shape shown in FIGS. 4 and 5. The clip 80 includes a central member 81 having rounded end or bight 82 and a pair of opposed V-shaped deflectable legs leg portions 84, 85 integral with the end 82 and which straddle the bottom 72 of the tab 70.

The clips 80 also has left and right generally U-shaped members 86 and 87 integral with but spaced from the sides of the central member 81. The generally U-shaped members 86 and 87 each include a rounded end or bight 88 and a pair of opposed deflectable legs or leg portions 90 and 91 which straddle the bottom 72 of the tab 70. The legs 90 and 91 adjacent their ends here are provided with reversely extending barbs 92. The legs 90 and 91 are self-biased toward a normal free state position in which the transverse distance between the barbs 92 thereof is less than the thickness of the bottom 72 of the tab 70. The legs 90 and 91 are adapted to be force fitted over the tab 70 and with the legs 90 and 91 being deflected outwardly as they receive the tab 70. The legs 90 and 91 at their free ends are bent away from each other to facilitate receiving the tab 70 therebetween. The barbs 92 are bent so as to allow the legs 90 and 91 to be slid over the surfaces of the bottom 72 of the tab 70 until the tab 70 engages the rounded end 82. However, reverse movement of the legs 90 and 91 cannot take place due to the fact that the barbs 92 will bite into the bottom 72, since the self-biasing forces of the legs 90 and 91 are tending to move the legs 90 and 91 towards each other. Thus the spring clip 80 is securely retained on the tab 70.

The deflectable legs 84, 85 of the central member 81 are generally V-shaped, as viewed in side elevation, and with the legs 84 and 85 also overlying and engaging the opposite sides of the bottom 72 of the tab 70. The legs 84, 85 are self-biased toward a normal free state position in which the apices 84a, 85a of the V-shaped legs 84 and 85 are spaced apart such that the transverse dimension therebetween is greater than the height of the openings 36 in the instrument panel 12. The legs 84, 85 at their free ends remote from the end 82 are reversely bent to facilitate receipt of the tab 70 and to prevent the legs from biting into the tab 70.

The provision of the sides 73, 74 on the tab 70 prevents the spring clip 80 from being laterally shifted and disengaged from the tab 70. The openings 36 in the instrument panel 42 are also oversized in a horizontal direction. That is, the width of the openings in the horizontal direction is greater than the width of the tabs 70 so that in the event of misalignment between the tabs 70 and the openings 36 in the instrument panel 42, the fasteners 34 can still be received through the openings 36.

In operation, when the bezel 25 is being attached to the instrument panel 12, the spring clip 80 will be force fitted through the openings 36. As the spring clip 80 is inserted into the openings 36, the legs 84, 85 of the central member 81 will be deflected towards each other from their normal free state position by the instrument panel edges defining the openings 36 until the apices 84a, 85a clear the opening 36 whereupon the self-biasing forces of the legs 84, 85 will return to their normal free state position and engage the back side of the instrument panel 42 to biasingly retain the bezel 25 in place on the instrument panel 42, as shown n FIGS. 3 and 4. During insertion, the legs 84, 85 slide on the bottom 72 of the tab 70.

It should be noted that the legs 84, 85 can be deflected in the reverse direction to allow the bezel 25 to be removed from the instrument panel 42 when disassembly of the bezel 25 is necessitated due to servicing of the radio. The spring clips 80, however, will remain attached to the tab 70 due to the provision of the barbs 90 securely retaining the spring clip 80 on the tabs 70. An important advantage of the fastener means 34 is that the bezel 25 can be attached to the instrument panel 42 even if there is slight misalignment between the tabs 70 and the openings 36 in the instrument panel 42. In addition, the fasteners 34 provide an attachment means without any fasteners being visible to the driver or passengers in the vehicle.

Another advantage is that the bezel can be readily detached, if necessary, from the instrument panel 42.

From the foregoing, it should be apparent that a novel radio mounting assembly has been provided which includes a bezel 25 for concealing the space between the radio and the opening in the instrument panel and wherein the bezel is automatically centered with respect to the radio face when being attached to the instrument panel and wherein the bezel 25 is detachably held in place on the instrument panel without any unsightly fasteners being visible.

Although the illustrated embodiment has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A mounting assembly for mounting a vehicle component means to an instrument panel means of an automotive vehicle comprising first and second mounting brackets secured to the component means at opposite side locations thereof and which are secured to the instrument panel means and with the component means having its front face extending through an opening in the instrument panel means, a trim bezel surrounding said front face of said component means and covering said opening in said instrument panel means and means for attaching said trim bezel in place, the improvement being that
  (a) said first and second mounting brackets have a flange with a planar surface and said bezel has a rear planar face which face toward each other,
  (b) one of said first mounting bracket and bezel has an integral cylindrical pin extending perpendicular to its planar surface,
  (c) one of said second mounting bracket and bezel has an integral, vertically disposed rectangularly shaped pin extending perpendicular to its planar surface,
  (d) the other of said bezel and first mounting bracket has a first cylindrically shaped bushing of a predetermined axial length and extending perpendicular from its planar surface and,
  (e) the other of said bezel and second mounting bracket has a rectangularly shaped bushing of a predetermined axial length extending perpendicular from its planar surface and whose internal width is greater than the width of said rectangular pin, said first and second bushings snugly receiving said cylindrical pin and said rectangular pin along its upper and lower side edges and with the ends of said first and second bushings engaging said planar surfaces of said other of said bezel and said first and second brackets, respectively, when the bezel is attached to said instrument panel means whereby said bezel is centered both horizontally and vertically relative to said face of said component means and properly positioned fore and aft relative to the face of said component means, and (f) wherein said means for attaching said bezel to the instrument panel means comprises a plurality of deflectable fasteners on said bezel adjacent its rear face which are force fitted through openings in said instrument panel means to retain the bezel in place and without the fasteners being visible from the front face of said bezel.

2. A radio mounting assembly for mounting a radio to an instrument panel means of an automotive vehicle comprising first and second mounting brackets secured to the radio at opposite side locations thereof and secured to the instrument panel means and with the radio having its front face extending through an opening in the instrument panel means, a decorative trim bezel surrounding said front face of said radio and covering said opening in said instrument panel means, and means for attaching said trim bezel in place, the improvement being that (a) said first mounting bracket includes a flange having a planar surface and an integral cylindrical pin extending perpendicular to said planar surface and facing toward said bezel, (b) said second mounting bracket includes a flange having a planar surface and an integral, vertically disposed rectangularly shaped pin extending perpendicular to said planar surface, (c) said bezel has a first cylindrically shaped bushing of a predetermined axial length and extending perpendicular from its rear face and, (d) a second rectangularly shaped bushing of a predetermined axial length extending perpendicular from its rear face and whose internal width is greater than the width of said rectangular pin on said second bracket, said first and second bushings snugly receiving said cylindrical pin and said rectangular pin along its upper and lower side edges and with their ends engaging said planar surfaces of said first and second brackets, respectively, when the bezel is attached to said instrument panel means where by said bezel is centered both horizontally and vertically relative to said face of said radio and properly positioned fore and aft relative to the face of said radio, and (e) wherein said means for attaching said bezel to the instrument panel means comprises a plurality of deflectable fasteners carried by said bezel adjacent its rear face which are force fitted through openings in said instrument panel means to retain the bezel in place and without the fasteners being visible from the front face of said bezel.

3. A radio mounting assembly, as defined in claim 2, and wherein said first and second bushings have axially extending slots through their sides to increase the radial flexibility of the same when respectively receiving said cylindrical and rectangular pins during assembly and to prevent binding and cracking of the bushings.

4. A radio mounting assembly for mounting a radio to an instrument panel means of an automotive vehicle comprising first and second mounting brackets secured to the radio at opposite side locations thereof and secured to the instrument panel means and with the radio having its front face extending through an opening in the instrument panel means, a decorative trim bezel surrounding said front face of said radio and covering said opening in said instrument panel means, and means for attaching said trim bezel in place, the improvement being that (a) said first mounting bracket includes a flange having a planar surface and an integral cylindrical pin extending perpendicular to said planar surface and facing toward said bezel, (b) said second mounting bracket includes a flange having a planar surface and an integral, vertically disposed rectangularly shaped pin extending perpendicular to said planar surface, (c) said bezel has a first cylindrically shaped bushing of a predetermined axial length and extending perpendicular from its rear face and, (d) a second rectangularly shaped bushing of a predetermined axial length extending perpendicular from its rear face and whose internal width is greater than the width of said rectangular pin on said second bracket, said first ad second bushings snugly receiving said cylindrical pin and said rectangular pin along its upper and lower side edges and with their ends engaging said planar surfaces of said first and second brackets, respectively, when the bezel is attached to said instrument panel where by said bezel is centered both horizontally and vertically relative to said face of said radio and properly positioned fore and aft relative to the face of said radio, and (e) wherein said means for attaching said bezel to the instrument panel comprises a plurality of clips carried by rearwardly extending tabs integral with said bezel at its rear face, said clips including oppositely disposed generally V-shaped deflectable leg portions which are force fitted through openings in said instrument panel means to retain the bezel in place and without the clips being visible from the front face of said bezel.

5. A radio mounting assembly, as defined in claim 4, and wherein said first and second bushings have axially extending slots through their sides to increase the radial flexibility of the same when respectively receiving said cylindrical and rectangular pins during assembly and to prevent binding and cracking of the bushings.

6. A radio mounting assembly, as defined in claim 5, and wherein said openings in said instrument panel means for receiving said clips carried by said tabs on said bezel are wider than said tabs so that the latter can be received through the openings in said instrument panel means even if the tabs are horizontally misaligned with the openings in the instrument panel means.

7. A radio mounting assembly, as defined in claim 6, and wherein said clips are made from a resilient metal material, wherein said opposed deflectable leg portions of said clips straddle opposite sides of said tabs and with the deflectable leg portions adjacent their free ends being slidably engaged with the tabs, and wherein said deflectable leg portions of said clips are self biased toward a normal free state position in which the maximum transverse dimension between their respective apices is greater than the maximum height of said openings in said instrument panel means for receiving said clips whereby said leg portions of said clips are deflected toward each other in opposition to their self-biasing forces upon being force fitted through their associated openings in the instrument panel means until the apices thereof clear the associated openings whereupon the self-biasing forces of the leg portions return the leg portions toward their normal free state position in which the leg portions adjacent the apices thereof engage the back side of said instrument panel means to retain the bezel in place.

8. A radio mounting assembly, as defined in claim 7, and wherein said clips also include a pair of U-shaped portions located adjacent opposite sides of said deflectable leg portions, said U-shaped portions having opposed legs which straddle said tabs and with the legs having lanced barbs which bite into said tabs when the clip is assembled thereto to prevent the clip from being removed from said tab.

9. A radio mounting assembly, as defined in claim 8, and wherein said tabs on said bezel are channel shaped to define a planar bottom and a pair of sides to retain the clips against lateral displacement.

10. A radio mounting assembly, as defined in claim 9, and wherein said cylindrical and rectangular pins are tapered at their free ends to facilitate their being received in said first and second bushings, respectively.

* * * * *